United States Patent [19]

Nelson

[11] Patent Number: 4,822,382

[45] Date of Patent: Apr. 18, 1989

[54] COMPOSITE MEMBRANES, THEIR MANUFACTURE AND THEIR USE

[75] Inventor: Joyce K. Nelson, Lexington, Mass.

[73] Assignee: Union Carbide Corporation, Danbury, Conn.

[21] Appl. No.: 115,913

[22] Filed: Nov. 2, 1987

[51] Int. Cl.⁴ .............................................. B01D 53/22
[52] U.S. Cl. .......................................... 55/16; 55/68; 55/158; 427/430.1; 428/394
[58] Field of Search .............................. 55/16, 68, 158; 210/490, 500.23, 500.27, 500.28; 427/244, 245, 430.1; 428/394

[56] References Cited

U.S. PATENT DOCUMENTS

| | | | |
|---|---|---|---|
| Re. 30,351 | 7/1980 | Hoehn et al. | 55/16 |
| 3,579,607 | 5/1971 | Matzner et al. | 528/29 X |
| 3,822,202 | 7/1974 | Hoehn | 55/16 |
| 3,957,651 | 5/1976 | Kesting | 210/500.28 X |
| 4,207,192 | 6/1980 | Coplan et al. | 55/158 X |
| 4,364,759 | 12/1982 | Brooks et al. | 55/16 X |
| 4,439,217 | 3/1984 | Yamabe et al. | 55/16 X |
| 4,467,001 | 8/1984 | Coplan et al. | 118/420 X |
| 4,528,004 | 7/1985 | Makino et al. | 55/158 |
| 4,568,579 | 2/1986 | Watson | 55/16 X |
| 4,652,283 | 3/1987 | Zampini et al. | 55/16 X |
| 4,666,644 | 5/1987 | Watson | 55/16 X |

FOREIGN PATENT DOCUMENTS

| | | | |
|---|---|---|---|
| 3445291 | 4/1986 | Fed. Rep. of Germany | 55/16 |
| 66880 | 6/1978 | Japan | 55/16 |
| 134629 | 10/1980 | Japan | 55/16 |
| 120206 | 7/1984 | Japan | 55/158 |
| 216603 | 12/1984 | Japan | 55/158 |
| 30524 | 2/1987 | Japan | 55/158 |

OTHER PUBLICATIONS

Cabasso et al., "Composite Hollow Fiber Membranes", J. of Applied Polymer Science, vol. 23, 1509–1525, (1979).

Pilato et al., "Polymers for Permselective Membrane Gas Separations", ACSP Reprints, 16, 41–44, (1975).

Cabasso et al., "Polysulfone Hollow Fibers, II. Morphology", J. of Applied Polymer Science, vol. 21, 165–180, (1977).

Cabasso et al., "Research & Development of NS-1 & Related Polysulfone Hollow Fibers for Reverse Osmosis Desalination of Seawater", Office of Water Research & Technology, 7/75.

*Primary Examiner*—Robert Spitzer
*Attorney, Agent, or Firm*—Alvin H. Fritschler

[57] ABSTRACT

The present invention is directed to composite membranes having a separation layer comprised of at least one poly(tetramethyl) bisphenol A phthalate resulting in enhanced separation and permeating characteristics. Processes for making these composite membranes and the methods of using them for gas separations are also disclosed.

48 Claims, No Drawings

COMPOSITE MEMBRANES, THEIR MANUFACTURE AND THEIR USE

BACKGROUND OF THE INVENTION

1. Field of the Invention

This invention pertains to the field of semi permeable membranes for separating at least one component of a gaseous mixture. More specifically, the present invention relates to composite membranes having a separation layer comprised of at least one poly(tetramethyl) bisphenol A phthalate resulting in enhanced separation and permeating characteristics.

2. Discussion of Related Art

Permeable membranes capable of separating at least one selected component from a fluid mixture, either gas or liquid, are considered in the art as a convenient, potentially highly advantageous means for achieving desirable fluid separation and/or concentration.

To achieve a selective separation, the membrane must exhibit less resistance to the transport of one or more components than that of at least one other component of the mixture. Thus, selective separation can provide preferential depletion or concentration of one or more desired components in the mixture with respect to at least one other component and therefore provide a product having a different proportion of the one or more desired components to the at least one other component than that proportion in the mixture.

However, in order for selective separation of one or more desired components by the use of separation membranes to be commercially attractive, the membranes must not only be capable of withstanding the conditions to which they may be subjected during the separation operation, but also must provide an adequately selective separation of the one or more desired components and a sufficiently high flux, i.e., permeation rate of the permeate per unit surface area, so that the use of the separation procedure is carried out on an economically attractive basis. Separation membranes which exhibit adequately high selective separation, but undesirably low fluxes, may require such large separating membrane surface area that the use of these membranes is not economically feasible. Similarly, separation membranes which exhibit a high flux, but low selective separation, may also be commercially unattractive.

Accordingly, work continues to develop separation membranes which can provide both an adequately selective separation of the one or more desired components and a sufficiently high flux such that the use of these separation membranes on a commercial basis is economically feasible.

Membranes are generally utilized for the separation of fluid mixtures in which the feed and the resulting raffinate and permeate do not undergo a phase change during the permeation process.

Membranes are also desired, however, in fluid separation processes that involve a phase change of one or more components of the mixture to be separated. The feed and the permeate streams are thus alternately in the liquid and gaseous state in such processes, with gas being present on one side of the membrane. An example of such a process is pervaporation through membranes, which is particularly useful in the separation of liquids from their azeotrope solvent mixtures, and wherein liquid is present on the feed side of the membrane. Another such process is perstruction, wherein liquid is present on the permeate side of the membrane.

Membranes have been fabricated in various shapes, such as (1) flat sheets which may be supported in a typical plate and frame structure similar to a filter press; (2) flat sheets rolled into spirals with spacing materials interleaved with the membrane and the assembly sealed to provide spiroidal channels permitting the passage of the feed on one side of the coiled membrane to the opposite side of the membrane; (3) as tubes lining the inner surface of a reinforced braid, the braid itself at times being a component in a larger tube; (4) in the form of open-ended hollow fibers so organized and sealed into header plates as to provide a separation of the flows over the external surfaces of the hollow fibers from any flow within the bores of the hollow fibers ensuing by virtue of passage of permeant across the membrane.

Various types of permeable membranes have been proposed in the art for carrying out a variety of fluid separation operations. Such membranes can generally be classified as being of the (1) isotropic, (2) asymmetric, or (3) composite type. The so-called isotropic and asymmetric type membranes are comprised essentially of a single permeable membrane material capable of selectively separating desired components of a fluid mixture. Isotropic membranes have the same density throughout the thickness thereof. Such membranes generally have the disadvantage of low permeability, i.e., low permeate flux, due to the relatively high membrane thickness necessarily associated therewith. Asymmetric membranes are distinguished by the existence of two distinct morphological regions within the membrane structure. One region comprises a thin, dense semi-permeable skin capable of selectively permeating one component of a fluid mixture. The other region comprises a less dense, porous, non-selective support region that serves to preclude the collapse of the thin skin region of the membrane under pressure.

Composite membranes generally comprise a thin layer or coating of a suitable permeable membrane material superimposed on a porous substrate. The separation layer, which determines the separation characteristics of the composite structure, is advantageously very thin so as to provide the desirably high permeability referred to above. The substrate only serves to provide a support for the thin membrane layer positioned thereon and has substantially no separation characteristics with respect to the fluid mixture being separated or concentrated.

The problems associated with the preparation of composite membranes are many. Most significantly, however, is the challenge of finding a material for use as the separation layer for a given application, which material not only displays high permeablity and high selectivity, but additionally possesses the necessary thermo-mechanical properties which makes it a good film former to consistently form a continuous thin film without defects or pinholes and be flexible enough for use in a composite membrane.

Accordingly, a need still exists for finding new materials suitable for use as separation layers in a composite membrane having high selectivity without sacrifice in permeation rate, while at the same time having the necessary thermomechanical characteristics necessary for making a thin, continuous film.

SUMMARY OF THE INVENTION

Applicant has discovered a new separation layer for use in a composite membrane which provides enhanced separating and permeating characteristics.

More particularly, Applicant has discovered that poly(tetramethyl) bisphenol A phthalates, when used alone or in admixture with one another, may advantageously and economically be utilized as a separating layer in a composite membrane. Not only are high selectivity and extremely high permeation rates obtained by the use of such a separation layer, but additionally, the poly(tetramethyl) bisphenol A phthalates also possess good film forming characteristics which are necessary for providing consistently continuous and flexible film layers substantially without voids.

In "ACS preprints", 16, 42 (1975) by Pilato, et al., poly(tetramethyl) bisphenol A polyesters and other polymers were formed into flat dense sheets and tested for their gas permeation characteristics, respectively. Pilato, et al. found that the permeability coefficient of various gases can be correlated with polymer density. The density of the polymer decreases and the permeability significantly increases by the introduction of bulky methyl groups on the bisphenol A moiety. Pilato, et al. did not carry out any mixed gas separations nor were asymmetric films prepared from any of the materials tested, particularly the bisphenol A polyesters.

Indeed, while an asymmetric membrane can theoretically be prepared from poly(tetramethyl) bisphenol A polyesters having desirably high gas permeabilities and separation factors, such poly(tetramethyl) bisphenol A polyester membranes have not been developed due to technical difficulties in preparing such an asymmetric membrane and due to the fact that these materials are not readily commercially available. Accordingly, not only is it technically very difficult to provide such membranes, but it is also not economically advantageous to provide such asymmetric membranes made entirely of poly(tetramethyl) bisphenol A phthalates, particularly if the membrane is in the form of hollow fibers.

Now, Applicant has discovered that the separation and permeating properties of poly(tetramethyl) bisphenol A phthalates can be utilized, and indeed enhanced, while at the same time making the use of such phthalates economically feasible, by utilizing them as a separation layer in a composite membrane. In this manner, inasmuch as only a relatively small amount of the poly(tetramethyl) bisphenol A phthalate is used in the composite membrane, preferably less than about 0.2 micron coating thickness, the cost of using such a polyester is significantly decreased.

Most importantly, however, the present invention provides a composite membrane which possesses unexpectedly high separating and permeating characteristics.

DETAILED DESCRIPTION OF THE INVENTION

The poly(tetramethyl) bisphenol A phthalates which are applicable to be used in the present invention include poly(tetramethyl) bisphenol A isophthalate; poly(tetramethyl) bisphenol A terephthlate; poly(tetramethyl) bisphenol A iso/terephthalate, in which the ratio of the isophthalate to terephthalate is in the range of from about 20:80 to 80:20, preferably 40:60 to 60:40 and most preferably 20:80 to 30:70, by weight; and combinations thereof.

These phthalates are well known to those skilled in the art and may be prepared by any conventional synthesis method. For example, they may be prepared by the esterification of a diaryl chloride and diol which is referred to and utilized in the Pilato, et al. article referred to above and which is discussed in more detail in Matzner, et al., U.S. Pat. No. 3,579,607. Generally, the method involves the preparation of a polyester from a diol and a dicarboyxlic acid chloride. Equal molar quantities of the diol are mixed with the dicarboxylic acid chloride. The mixture is heated slowly to a temperature of about 150° C. After about an hour at this temperature, the temperature is increased to about 280° C. and the flask is connected to a source of vacuum. It is then kept at this temperature for about 3 hours under 0.51 mm pressure. After cooling, the colorless solid is dissolved in methylene chloride. The viscous polymer solution is then coaqulated in methanol. The resulting phthalate precipitate is washed with methanol and dried at 60° C.

In order to prepare the coating material, the at least one poly(tetramethyl) bisphenol A phthalate must be dissolved in one or more solvents so as to form a solution. As will be discussed more fully hereinbelow, it is by means of this solution that the coating is applied to the porous substrate (which acts as a support layer in the composite membrane) and forms a separation layer. This is generally performed by passing or immersing the porous substrate surface through the coating solution.

Any suitable solvent or mixture of solvents for the at least one poly(tetramethyl) bisphenol A phthalate can be used and those skilled in the art will appreciate and know to select the preferred solvents that are suitable for this material. Generally, the solvent is one which will dissolve the poly(tetramethyl) bisphenol A phthalate material to produce a homogeneous solution. The solvent used to prepare the solution may also be a mixture of one or more solvents that will dissolve the poly(-tetr-amethyl) bisphenol A phthalate material with the addition of one or more non solvents which are used as additives. Such mixtures are generally preferred. Generally, it is desired that the non solvents have a slightly lower boiling point than the solvents or, alternatively, form an azeotropic mixture with the solvents that are employed. The important consideration, whether a single solvent or a mixture of solvent and non-solvent is used, is that the solution is preferably substantially homogeneous.

The solution should be of a low enough viscosity that it will be easily applied as an even coating on the porous substrate and preferably wets the porous substrate surface. The viscosity at application temperature can vary from less than about 50 centipoise and is generally from about 0.05 to about 10 to 20 centipoise.

The concentration of film-forming poly(tetramethyl) bisphenol A phthalate material in the solution is preferably less than 5% by weight, and more preferably is less than 1% by weight.

Illustrative of the solvents that can be used to prepare the solution are chlorinated hydrocarbons such as carbon tetrachloride, 1,1,1 trichloroethane, chloroform, 1,1,2 trichloroethane, and the like, which may be used alone or in combination with one another and which may also include lower aliphatic, cycloaliphatic, and fluorinated hydrocarbons, such as, pentane, cyclopentane, cyclopentene, hexane, cyclohexane, heptane, cycloheptane, cycloheptene, octane, Freon 12, and the like, alone or in combination with one another. One skilled in the art would know, or could readily ascertain, which solvents are suitable for the polyaryl phthalates of the present invention for use in conjunction with a particular substrate.

The substrate upon which the separation layer is coated may be in spiral wound, flat sheet, hollow fiber, or other desired form, with the hollow fiber form being the most preferred.

Those skilled in the art will appreciate that porous substrates have any of these forms and they are aware of the many methods available for their production and their ready commercial availability.

The invention is further described herein, for convenience of description, with particular reference to hollow fibers or polysulfone hollow fiber composite membranes. It will be understood, however, that the scope of the invention is not limited to the use of composite membranes in hollow fiber form. It is within the scope of the invention to employ any composite membrane composition prepared as herein for use in desired gas separation operations.

The hollow fibers, as disclosed, for example, by Cabasso, et al., in "Research and Development of NS-1 and Related Polysulfone Hollow Fibers for Reverse Osmosis Desalination of Seawater", Gulf South Research Institute, July 1985, Distributed by National Technical Information Service, U.S. Department of Commerce Publication PB 248,666, have continuous channels for fluid flow extending between the exterior and interior surfaces. Frequently, the pores have an average cross-sectional diameter less than about 20,000 and in some hollow fibers the cross-sectional diameter is less than about 1,000 or 5,000 angstroms. Advantageously, the walls of the hollow fibers are sufficiently thick that no special apparatus is required for their handling. Frequently, the hollow fibers may have outside diameters of about 20 to 1,000 microns, generally about 50 to 1,000 microns, and have walls of at least about 5 microns in thickness. The wall thickness in some hollow fibers may be up to about 200 or 300 microns.

In order to provide desirable fluxes through the hollow fibers, particularly using those hollow fibers having walls at least about 50 microns in thickness, the hollow fibers may have a substantial void volume. Voids are regions within the walls of the hollow fibers which are vacant of the material of the hollow fibers. Thus, when voids are present, the density of the hollow fiber is less than the density of the bulk material of the hollow fiber. Often, when voids are desired, the void volume of the hollow fibers is up to about 90, generally about 10 to 80, and sometimes about 20 or 30 to 70, percent based on the superficial volume, i.e., the volume contained within the gross dimensions, of the hollow fiber. The density of the hollow fiber can be essentiality the same throughout its thickness, i.e., isotropic, or the hollow fiber can be characterized by having at least one relatively dense region within its thickness in barrier relationship to fluid flow through the wall of the hollow fiber, i.e., the hollow fiber is anisotropic. Generally, a relatively dense region of anisotropic hollow fibers is substantially at the exterior or interior of the hollow fiber, and preferably, the coating contacts this relatively dense region.

The material used for the hollow fiber may be a solid natural or synthetic substance. The selection of the material for the hollow fiber may be based on the heat resistance, solvent resistance, and/or mechanical strength of the hollow fiber, as well as other factors dictated by the intended separation process in which it will be used and the operating conditions to which it will be subjected. The hollow fibers may be flexible or substantially rigid. The material used for the hollow fibers may be inorganic to provide, e.g., glass, ceramic, sintered metal, or the like, fibers. In the case of polymers, both addition and condensation polymers which can be fabricated in any suitable manner to provide porous hollow fibers, are included. Generally organic, or organic polymers mixed with inorganic materials (e.g., fillers), are used to prepare the hollow fibers. Typical polymers can be substituted or unsubstituted polymers and may be selected from polysulfones, such as bisphenol A polysulfone (sold under the mark "Udel" by Union Carbide Corporation) or polyether sulfone (sold under the mark "Victrex" by Imperial Chemical Industries); poly(styrenes), including styrene-containing copolymers such as acrylonitrile-styrene copolymers, styrene butadiene copolymers and styrene vinylbenzylhalide copolymers; polycarbonates; cellulosic polymers, such as cellulose acetate; cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide); polyurethanes; poly(esteramide-diisocyanate); polyesters (including polyarylates), such as poly(ethylene terephthalate), poly(alkyl methacrylates), poly(alkyl acrylates), poly(phenylene terephthalate), etc.; polysulfides; polymers from monomers having alpha olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl urethanes), poly(vinyl ureas); polyallyls; polyhydrazides; polyoxadiazoles; polytriazoles, poly(benzimidazole); polyphos-phazines; etc., and interpolymers, including block terpolymers containing repeating units from the above; and grafts and blends containing any of the foregoing. Typical substituents providing substituted polymers include halogens such as bromine; hydroxyl groups; lower alkyl groups; lower alkoxy groups; monocyclic aryl; lower acyl groups and the like.

Substrates prepared from polysulfone are particularly preferred.

The polysulfone or other hollow fiber substrates employed in the practice of particular embodiments of the present invention can be prepared in accordance with conventional techniques well known in the art. Hollow fibers are generally spun from a dope composition of the desired fiber polymer, quenched, washed and dried. As disclosed by Cabasso, et al. in "Composite Hollow Fiber Membranes", Journal Of Applied Polymer Science, Volume 23, 1509–1525 (1979) and in "Polysulfone Hollow Fibers", Journal of Applied Polymer Science, Volume 21, 165–180 (1977), polysulfone hollow fibers can be spun from a ternary solution of polysulfone, poly(vinyl pyrrolidone) and dimethylacetamide, with the total polymeric concentration in the solution desirably being 40 to 52 weight %, and the polysulfone/-poly(vinyl pyrrolidone) ratio being 1.5:2.0. The well known tube-in-tube jet technique is disclosed as being suitable for the spinning procedure, with water at about 21° C. being the preferred outside quench medium for the fibers. The quench medium in the center of the fiber is desirably air. Quenching is followed by washing the fibers, conveniently with hot water at about 50° to 60° C. Following such washing, the hollow fibers are dried prior to being coated with the separation film layer to form the desired composite membrane. For this purpose, the polysulfone hollow fibers are typically dried by passage through a hot air drying column for a suitable period of time.

The dried polysulfone hollow fiber is coated with the coating solution of the present invention containing the at least one poly(tetramethyl) bisphenol A polyester in a coating and drying sequence. This coating and drying sequence conveniently comprises the technique used and described in the Coplan, et al. patent, U.S. Pat. No. 4,467,001. Thus, the dried hollow fiber is passed through the coating solution contained in a coating vessel, and is then passed through a drier oven and a cure oven for contact with drying air or other suitable gas, and higher temperature curing air or other gas prior to being taken up on a winder or otherwise being processed or stored for eventual incorporation in membrane modules suitable for use in commercial fluid separation operations.

For the coating of polysulfone hollow fibers with a poly(tetramethyl) bisphenol A polyester, it is generally desirable to employ drying temperatures of from about 20° C. to about 120° C. Those skilled in the art will appreciate that it is also possible to dry the separation layer on the support layer without employing the separate curing step described above.

Generally, the thickness of separating layer that is coated onto the porous support layer is less than about 0.4 microns, preferably is about 0.05 to about 0.2 microns, and most preferably is less than about 500 angstroms.

In a preferred embodiment of the present invention, the substrate is subjected to a high temperature annealing process. Although it is preferable to anneal the substrate prior to its being coated with the at least one poly(tetramethyl) bisphenol A polyester of the present invention, the annealing process may be carried out on the coated substrate as well. The resulting composite membrane formed from such an annealed substrate, when used with the coating of the present invention, provides for an even greater enhancement in both separation and permeation characteristics.

Most importantly, however, the annealing of the substrate provides for an increase in compaction resistance and membrane collapse pressure tolerance. Thus, it is well known that membrane compaction, particularly at high pressure and temperature conditions such as exist with membrane gas separation of, for example, ammonia vent recovery, may cause membrane compaction with the concurrent loss of permeation and separation characteristics or even total membrane collapse. With annealing, however, the substrate shows superior pressure compaction resistance.

More particularly, polysulfone support membranes or other support membranes applicable in the present invention having high glass transition temperatures (Tg), e.g., above about 100° C., may be annealed at temperatures that are close to their glass transition temperature, typically about 4° to 15° C. below the Tg of the particular support substrate.

The substrates are annealed by exposing them for a very short period of time to high temperature under non-solvent and non-swelling environmental conditions.

The annealing process can be asymmetric in nature and can result in mostly surface modification or can further cause modification throughout the entire membrane structure. Polysulfone membranes prepared from a bisphenol A type polysulfone ("Udel", Union Carbide Corporation), for example, can be annealed by exposure to high temperature air, or other hot non-swelling liquids, or to any other high temperature environment with non-solvent, non-swelling characteristics towards the substrate. More specifically, the "Udel" polysulfone fibers may be annealed by drying these fibers at 115° C. by passage through a hot air drying column which fibers are then annealed by passing them through another hot air oven at a temperature of about 182° C. which is close to the glass transition temperature of the polysulfone (184°-186° C.). The residence time in the oven is generally about 5 seconds to 4 minutes, preferably about 10 to 30 seconds.

In use, the composite membrane will generally be assembled as part of a membrane separating device. The membrane device is designed to carry out a selective separation of at least one component from a fluid stream mixture. The membrane apparatus will typically consist of an enclosure and a membrane assembly positioned therein. The membrane assembly can be constructed in the form of a spiral wound cartridge, a hollow fiber bundle, a pleated flat sheet membrane assembly, and like assemblies common in the membrane industry. The membrane assembly is constructed so as to have a feed surface side and an opposite permeate exit side. The enclosure is constructed so as to enable the feed stream mixture to be brought into contact with the membrane feed surface side. Conduit means are provided for the removal of the part of the feed stream that did not permeate through the membrane, and for the separate removal of the permeate components that have passed through the membrane.

In conducting gas separations, including concentrations, employing the composite membranes of the present invention, the exit side of the membrane is maintained at a lower partial pressure for at least one permeating component than the partial pressure at the feed side. The driving force for the desired permeation through the membrane is a differential in partial pressures across the membrane. Permeating components pass into and through the membrane and can be removed from the vicinity of the exit side of the membrane to maintain the desired driving force for the permeating gas. The functionality of the membrane does not depend upon the direction of feed flow or the surface of the membrane which is first contacted by the gaseous feed mixture.

The present invention can advantageously be employed in a wide variety of practical commercial operations, such as air separation, the recovery of hydrogen from ammonia purge gas and from refinery streams, carbon dioxide and methane separations in a variety of operations, hydrogen removal from a mixture of hydrogen and methane, or hydrogen removal from a mixture of nitrogen and methane, and the like. In all such embodiments, it will be appreciated that the separation layer determines the separation characteristics of the composite membranes and that it will be selected for its desired selectivity with respect to the fluid mixture desired to be separated and/or concentrated, and that the support layer will also be selected for its overall convenience and combination of permeablity characteristics as it pertains to any given separation.

By means of the present invention, a membrane is provided which advantageously has high selectivity and permeating characteristics and which membrane can desirably be made in a very economical manner. Thus, by using the poly(tetramethyl) bisphenol A phthalates as a thin separating layer in a composite membrane and by appreciating and recognizing that these phthalates can effectively be used as such a separating layer, Applicant has been able to successfully circumvent the problem of the high cost of these polyesters and at the same time provide a composite membrane having excellent separating and permeating properties.

As used herein, it will be understood that the selectivity, or separation factor, of a membrane or membrane module assembly represents the ratio of the permeate rate of the more permeable to the less permeable component of a mixture being separated which permeability is expressed in $ft^3(STP)/ft^2 \cdot day \cdot psi$.

The invention is hereinafter further described with respect to various illustrative examples of the practice thereof. It should be understood, however, that such examples should not be construed as limiting the scope of the invention which is set forth in the appended claims.

EXAMPLE 1

A composite hollow fiber membrane is prepared by coating polysulfone hollow fibers with a solution of poly(tetramethyl) bisphenol A isophthalate/terephthalate.

The polysulfone hollow fibers are spun from a polysulfone dope solution, quenched, washed and dried in accordance with conventional techniques.

A solution of the poly(tetramethyl) bisphenol A phthalates is prepared by dissolving 0.75 weight percent poly(tetramethyl) bisphenol A polyesters (25% isophthalate/75% terephthalate) in carbon tetrachloride. The thusly formed solution is then filtered through a 1.5 micron glass filter.

The polysulfone hollow fibers are passed through the thusly formed coating solution which is contained in a coating vessel and then passed through a drier oven and a curing oven for contact with drying air and higher curing air prior to being taken up on a winder. The coating, drying and curing sequence is further described in Coplan, et al., U.S. Pat. No. 4,467,001, the contents of which are incorporated herein by reference.

A hollow fiber separatory module is constructed utilizing an annulus of said hollow fibers with the open ends thereof encased in a potting compound and a collection chamber communicating with said open ends adjacent to said potting compound. Further details relating to said separatory module are contained in the Coplan, et al. patent, U.S. Pat. No. 4,207,192, the contents of which are incorporated herein by reference.

The thusly prepared composite membrane is tested for its air separation characteristics at 100 psig and 25° C. The following gas separation characteristics are exhibited: the separation factor between oxygen and nitrogen is 5.5 and the permeation rate of oxygen is 0.10 ft.$^3$(STP)/ft$^2 \cdot$day$\cdot$psi.

EXAMPLE 2

Example 1 is repeated with the exception being that the polysulfone substrate is first annealed prior to it being coated with the blend of poly(tetramethyl) bisphenol A iso/terephthalate.

The polysulfone fibers are annealed by passing the fibers through a hot-air oven maintained at a temperature of 182° C. for a period of 10 seconds.

The annealed fibers are then coated in a manner set forth in Example 1 with the blend of poly(tetramethyl) bisphenol A iso/terephthalate and tested for gas separation characteristics with compressed air at 100 psig and 20° C. exhibiting in the following gas separation characteristics: the separation factor between oxygen and nitrogen is 5.8 and the permeation rate of oxygen is 0.19 ft$^3$(STP)/ft$^2 \cdot$day$\cdot$psi.

EXAMPLE 3

Example 2 is repeated with the exception that instead of using poly(tetramethyl) bisphenol A iso/terephalate (25% iso- and 75% terephthalate), poly(tetramethyl) bisphenol A iso/terephthalate (75% iso- and 25% terephthalate) is used instead to coat the polysulfone hollow fibers.

The thusly prepared composite membrane is tested for its gas separation characteristics with compressed air at 100 psig and 20° C. The following gas separation characteristic are exhibited: the separation factor between oxygen and nitrogen is 5.8 and the permeation rate of oxygen is 0.13 ft$^3$(STP)/ft$^2 \cdot$day$\cdot$psi.

EXAMPLE 4

Example 2 is repeated with the exception that instead of using carbon tetrachloride as the solvent in the solution, a mixture of 1,1,1 trichloroethane and cyclohexane is used. A 0.75 weight percent solution of poly(tetramethyl) bisphenol A iso/terephthlate (25% iso- and 75% terephthlate) in 60% 1,1,1 trichloroethane and 40% cyclohexane by volume is utilized as the coating solution.

The thusly prepared composite membrane is tested for its gas separation characteristics with compressed air at 100 psig and 20° C. The following gas separation characteristics are exhibited: the separation factor between oxygen and nitrogen is 5.9 and the permeation rate of oxygen is 0.2 ft$^3$(STP)/ft$^2 \cdot$day$\cdot$psi.

What is claimed is:

1. A method for separating a gas in a gaseous mixture from at least one other gas in said gaseous mixture by selective permeation and providing a permeated product containing at least one permeating gas, comprising: contacting the gaseous mixture with one surface of a composite membrane, which, with respect to at least one pair of gases of said gaseous mixture, the composite membrane exhibits selective permeation of one gas of said pair of gases over that of the remaining gas of said pair of gases, and which composite membrane comprises a porous support layer having substantially no separation characteristics with respect to said fluid mixture and a separation layer positioned on the support layer comprised of at least one or more poly(tetramethy ) bisphenol A phthalates; permeating said at least one permeating gas into and through the composite membrane; and removing from the vicinity of the opposite surface of the composite membrane a permeated product having a different proportion of said at least one gas of said gaseous mixture to said at least one other gas of said gaseous mixture than the proportion in the gaseous mixture of said at least one gas to said at least one other gas.

2. The method of claim 1, wherein the said at least one gas comprises hydrogen and the gas mixture comprises hydrogen and nitrogen.

3. The method of claim 1, wherein the said at least one gas comprises hydrogen and the gas mixture comprises hydrogen and methane.

4. The method of claim 1, wherein the said at least one gas comprises carbon dioxide and the gas mixture comprises carbon dioxide and methane.

5. The method of claim 1, wherein the said at least one gas comprises nitrogen and the gas mixture comprises nitrogen and oxygen.

6. The method of claim 1, wherein the ratio of isophthalate to terephthalate in the poly(tetramethyl) bisphenol A iso/terephthalate is in the range of from about 20:80 to 80:20, by weight.

7. The method of claim 1, wherein the ratio of isophthalate to terephthalate in the poly(tetramethyl) bisphenol A iso/terephthalate is in the range of from about 40:60 to 60:40, by weight.

8. The method of claim 1, wherein the ratio of isophthalate to terephthalate in the poly(tetramethyl) bisphenol A iso/terephthalate is in the range of from about 20:80 to 30:70, by weight.

9. The method of claim 1, wherein the thickness of the separating layer is less than about 0.4 microns.

10. The method of claim 1, wherein the thickness of the separating layer is from about 0.05 to about 0.2 microns.

11. The method of claim 1, wherein the thickness of the separating layer is about 500 angstroms.

12. The method of claim 1, wherein the support layer comprises a polymeric material.

13. The method of claim 12, wherein the support layer comprises at least one of polysulfone, polyolefins, polyphenylenesulfide, polyether ketone, polyamides and polyimides.

14. The method of claim 12, wherein the support layer is polysulfone.

15. The method of claim 12, wherein the substrate is an annealed polymeric material.

16. The method of claim 1, wherein the composite membrane is in hollow fiber form.

17. A composite membrane capable of selectively permeating at least one more permeable component of a gaseous mixture comprising:
(a) a porous support layer having substantially no separation characteristics with respect to said gaseous mixture; and
(b) a separation layer positioned on the support layer comprised of at least one or more poly(tetramethyl) bisphenol A phthalate, said separation layer determining the separation characteristics of the composite membrane.

18. The composite membrane of claim 17, wherein the poly(tetramethyl) bisphenol A phthalate is selected from the group consisting of poly(tetramethyl) bisphenol A isophthalate, poly(tetramethyl) bisphenol A terephthalate, poly(tetramethyl) bisphenol A iso/terephthalate, and mixtures thereof.

19. The composite membrane of claim 18, wherein the ratio of isophthalate to terephthalate in the poly(tetramethyl) bisphenol A iso/terephthalate is in the range of from about 20:80 to 80:20, by weight.

20. The composite membrane of claim 18, wherein the ratio of isophthalate to terephthalate in the poly(tetramethyl) bisphenol A iso/terephthalate is in the range of from about 40:60 to 60:40, by weight.

21. The composite membrane of claim 18, wherein the ratio of isophthalate to terephthalate in the poly(tetramethyl) bisphenol A iso/terephthalate is in the range of from about 20:80 to 30:70, by weight.

22. The composite membrane of claim 17, wherein the thickness of the separation layer is less than about 0.4 microns.

23. The composite membrane of claim 17, wherein the thickness of the separating layer is from about 0.05 to about 0.2 microns.

24. The composite membrane of claim 17, wherein the thickness of the separating layer is 500 angstroms.

25. The composite membrane of claim 17, wherein the support layer comprises a polymeric material.

26. The composite membrane of claim 25, wherein the support layer comprises at least one of polysulfone, polyolefins, polyphenylenesulfide, polyether ketone, polyamides and polyimides.

27. The composite membrane of claim 25, wherein the substrate is an annealed polymeric material.

28. The composite membrane of claim 17, wherein the support layer comprises polysulfone.

29. The composite membrane of claim 17, wherein the composite membrane is in hollow fiber form.

30. A process for the preparation of a composite membrane capable of selectively permeating at least one more readily permeable component of a gaseous mixture comprising:
(a) providing a support layer;
(b) providing a solution containing at least one or more poly(tetramethyl) bisphenol A phthalates and a solvent therefore, which solvent is a non-solvent for the support layer;
(c) coating the support layer with the solution to provide a separation layer on the support layer;
(d) drying said separation layer on the support layer to form the composite membrane wherein the separation layer determines the separation characteristics of the membrane and the support layer has substantially no separation characteristics with respect to said gaseous mixture.

31. The process of claim 30, wherein the amount of phthalate in the solution is less than 5% by weight.

32. The process of claim 30, wherein the amount of phthalate in the solution is less than 1% by weight.

33. The process of claim 30, wherein the solvent for the solution is carbon tetrachloride, 1,1,1 trichloroethane, 1,1,2 trichloroethane, or mixtures thereof, and the support layer is polysulfone.

34. The process of claim 33, wherein the solution additionally contains a non-solvent for the at least one or more poly(tetramethyl) bisphenol A phthalates.

35. The process of claim 34, wherein the non-solvent is selected from the group consisting of pentane, cyclopentane, cyclopentene, hexane, cyclohexane, heptane, cycloheptane, cycloheptene, octane, fluorinated hydrocarbons and mixtures thereof.

36. The process of claim 30, wherein the thickness of the separation layer is less than about 0.4 microns.

37. The process of claim 30, wherein the thickness of the separation layer is from about 0.05 to about 0.2 microns.

38. The process of claim 30, wherein the thickness of the separation layer is 500 angstroms.

39. The process of claim 30, wherein the support layer comprises a polymeric material.

40. The process of claim 39, wherein the support layer comprises at least one of polysulfone, polyolefins, polyphenylenesulfide, polyether ketone, polyamides and polyimides.

41. The process of claim 39, wherein the substrate is an annealed polymeric material.

42. The process of claim 30, wherein the support layer comprises polysulfone.

43. A process of claim 30, wherein the composite membrane is in hollow fiber form.

44. The process of claim 30, wherein the ratio of isophthalate to terephthalate in the poly(tetramethyl) bisphenol A iso/terephthalate is in the range of from about 20:80 to 80:20, by weight.

45. The process of claim 30, wherein the ratio of isophthalate to terephthalate in the poly(tetramethyl) bisphenol A iso/terephthalate is in the range of from about 40:60 to 60:40, by weight.

46. The process of claim 30, wherein the ratio of isophthalate to terephthalate in the poly(tetramethyl) bisphenol A iso/terephthalate is in the range of from about 20:80 to 30:70, by weight.

47. The process of claim 30, wherein the solution containing the at least one or more poly(tetramethyl) bisphenol A phthalates and a solvent therefore additionally contains a non-solvent for the at least one or more poly(tetramethyl) bisphenol A phthalates.

48. The process of claim 47, wherein the non-solvent is selected from the group consisting of pentane, cyclopentane, cyclopentene, hexane, cyclohexane, heptane, cycloheptane, cycloheptene, octane, fluorinated hydrocarbons and mixtures thereof.

* * * * *